US007165245B2

(12) United States Patent
Robison

(10) Patent No.: US 7,165,245 B2
(45) Date of Patent: Jan. 16, 2007

(54) PRUNING LOCAL GRAPHS IN AN INTER-PROCEDURAL ANALYSIS SOLVER

(75) Inventor: Arch D. Robison, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 711 days.

(21) Appl. No.: 09/844,345

(22) Filed: Apr. 27, 2001

(65) Prior Publication Data

US 2002/0162096 A1 Oct. 31, 2002

(51) Int. Cl.
*G06F 9/45* (2006.01)
(52) U.S. Cl. .................. 717/145; 717/151; 717/154; 717/55; 717/156; 717/157
(58) Field of Classification Search .................. 717/4, 717/133, 140, 155, 159, 145, 157
See application file for complete search history.

(56) References Cited

U.S. PATENT DOCUMENTS

| | | | | |
|---|---|---|---|---|
| 5,671,419 | A * | 9/1997 | Carini et al. ................ | 717/145 |
| 5,740,443 | A * | 4/1998 | Carini ........................ | 717/133 |
| 6,077,313 | A * | 6/2000 | Ruf ............................ | 717/155 |
| 6,173,444 | B1 * | 1/2001 | Archambault ............... | 717/159 |
| 6,427,234 | B1 * | 7/2002 | Chambers et al. .......... | 717/140 |
| 6,665,865 | B1 * | 12/2003 | Ruf ............................ | 717/157 |
| 2002/0010911 | A1 * | 1/2002 | Cheng et al. ................ | 717/4 |

OTHER PUBLICATIONS

Rugina et al., Pointer Analysis for Multithreaded Programs, ACM, 1999.*
Bodik et al., Complete Removal of Redundant Expressions, ACM, 1998.*
Auslander et al., Fast, Effective Dynamic Compliation, ACM,1996.*
Murphy et al., Program Analysis with Partial Transfer Functions, ACM, 2000.*
Binkley,"Interprocedural Constant Propagation using Dependence Graphs and a Data-Flow Model," 1995.*
Cousot, P., and Cousot, R., Abstract Interpretation: A Unified Model for Static Analysis of Programs by Construction or Approximation of Fixpoints, In Conference Record of the Fourth Annual ACM SIGPLAN-SIGACT Symposium on Principles of Programming Languages, (Los Angeles, CA, 1977), ACM Press, 238-252.
Tool Interface Standards, *ELF: Executable and Linkable Format*, ftp://ftp.intel.com/tis/elf11g.zip.

(Continued)

*Primary Examiner*—Kakali Chaki
*Assistant Examiner*—Insun Kang
(74) *Attorney, Agent, or Firm*—Blakely, Sokoloff, Taylor & Zafman LLP

(57) ABSTRACT

The present invention is a method and system to reduce storage in a inter-procedural analysis solver. In one embodiment, local graphs are pruned. The local graphs represent local problems, which correspond to separately compilable components in a software program. Each of the local graphs has edges and vertices. Each edge has a transfer function. Each vertex has a value. Values of the local graph form a lattice under a partial ordering.

39 Claims, 15 Drawing Sheets

OTHER PUBLICATIONS

Unix International, Programming Languages SIG. *Dwarf Debugging Information Format*, Revision 2.0.0 (Jul. 27, 1993), ftp://ftp.intel.com/pub/tis/dwf11.zip.

Cheng, B.C., and Hwu, W.M., Modular Interprocedural Pointer Analysis Using Access Paths: Design Implementation and Evaluation. In *Proceedings of the SIGPLAN '00 Conference on Programming Language Design and Implementation* (Vancouver, British Columbia, Jun. 2000), ACM Press, 57-69.

Edison Design Group, C+++ *Front End, Internal Documentation* (*excerpt*), (Aug. 2000), http://www.edg.com/docs,edg_cpp.pdf.

Cooper, K.D., and Kennedy, K., and Torczon, L., Interprocedural Optimization: Eliminating Unnecessary Recompilation. In *Proceedings of SIGPLAN '86 Symposium on Compiler Construction* (Palo Alto, CA, Jun. 1986) ACM Press 58-67.

Burke, M., and Torczon, L.., Interprocedural Optimization: Eliminating Unnecessary Recompilation. In *ACM Transactions onProgramming Languages and Systems*, vol. 15(3), 367-399.

Hall, M.W., Hiranandani, S., Kennedy, K., and Tseng, C.W., Interprocedural Compilation of Fortran D for MIMD Distributed-Memory Machines, *Supercomputing*'92, 522-534.

Pollock, L.L., and Soffia, M.L., Incremental Global Reoptimization ofPrograms. In *ACM Transactions on Programming Languages and Systems*, vol. 14(2), 173-200.

Gough, K.J., and Klaeren, H., Executable Assertions and Separate Compilation. In *proceeding of 1997 Joint Modular Languages Conference* (Linz, Austria) Lecture Notes in Computer Science, vol. 1204, 41-52.

\* cited by examiner

← 320

```
Procedure ASSOCIATE_USE_ATTRIBUTE(g)
g:graph begin
    for each vertex u in g, do
        u.uses_named_vertex:= false;
    enddo
    for each vertex u do
        if u is a named vertex then
            MARK_USES(u)
        endif
    enddo
end Procedure MARK_USES(u)
u:vertex;

begin
    if (not u.uses_named_vertex) then
        u.uses_named_vertex:= true;
        for each edge of form u → v do
            MARK_USES(v)
        enddo
    endif
end
```

FIG. 5

```
Procedure ASSOCIATE_AFFECTS_ATTRIBUTE(g)
g:graph begin
    for each vertex v in g, do
        v.affects_named_vertex:= false;
    enddo
    for each vertex v do
        if v is a named vertex then
            MARK_AFFECTS(v)
        endif
    enddo
end Procedure MARK_USES(v)
v:vertex;

begin
    if (not v.affects_named_vertex) then
        v.affects_named_vertex:= true;
        for each edge of form u → v do
            MARK_AFFECTS(u)
        enddo
    endif
end
```

FIG. 6

UNREFERENCED
|
STATIC
|
EXTERNAL

*FIG. 8*

```
/*TRANSLATION UNIT #1*/        /*TRANSLATION UNIT #2*/ extern void c();               void b();
extern void e();               static void (*a)()=b;

static void f(){               extern void d();
    c();                       extern void e();
    e();
}                              void b(){
void d(){                          d();
    f();                           (*a)();
}                              }
void e(){                      void c(){
}                                  e();
main(){                        }
    d();
}
```

*FIG. 9*

| UNIT #1 EDGES | UNIT #2 EDGES | FUNCTION |
|---|---|---|
| main→d<br>d→@f<br>@f→c | b→@a<br>@a→b | {S,E}→S;<br>U→U |
| @f→c | c→e<br>b→d | {S,E}→E;<br>U→U |

FIG. 11

| UNIT #1 EDGES | UNIT #2 EDGES | FUNCTION |
|---|---|---|
| main → d<br>d → e | b → b | {S,E} → S;<br>U → U |
| d → c | c → e<br>b → d | {S,E} → E;<br>U → U |

FIG. 13

```
Procedure PRESOLVE(g)
g:graph begin
    do
        changed = false;
        for each edge u→v in g do
            if (not u.uses_named_vertex) then
                t := meet(v.val,((u->v).func)(u.val));
                if t ≠ v.val then
                    v.val := t;
                    changed := true;
                endif
            endif
        enddo
    while changed;
end
```

PRUNING LOCAL GRAPHS IN AN INTER-PROCEDURAL ANALYSIS SOLVER

BACKGROUND

1. Field of the Invention

This invention relates to compiler technology. In particular, the invention relates to inter-procedural analysis.

2. Background of the Invention

A compiler translates a source program to one or more object files. The source program may contain one or more translation units. A translation unit is a subroutine, a function, or any other separately compilable software entity. A compiler typically includes a front end and a back end. The front end typically performs lexical and syntactic analysis, creates symbol table, and generates intermediate code. The back end typically performs code optimization and generates the target object files. Inter-procedural analysis (IPA) is a phase in a compilation process to analyze the entire program and collect global information related to the translations units. The collected global information is then passed to the optimizer for global optimization.

Distributed IPA processes files on disk. When the file size is large, the disk access time may be excessive, resulting in slow compilation. When separately compilable software entities are represented by some data structures, the amount of storage may be large if the size or the number of the software entities is large. For distributed IPA, there may be several locally generated data structures to be written to and read from mass storage devices. Since access time for mass storage devices is slow, the large amount of information exchange via the mass storage may lead to inefficient usage.

Therefore, there is a need for a technique to reduce disk storage requirements and improve access time during compilation.

BRIEF DESCRIPTION OF THE DRAWINGS

The features and advantages of the present invention will become apparent from the following detailed description of the present invention in which:

FIG. 5 is a pseudo code illustrating a process to associate a use attribute shown in FIG. 3 according to one embodiment of the invention.

FIG. 6 is a pseudo code illustrating a process to associate an affect attribute shown in FIG. 3 according to one embodiment of the invention.

FIG. 8 is a diagram illustrating an example of a three-point value lattice according to one embodiment of the invention.

FIG. 9 is a diagram illustrating an example in the C programming language of two translation units according to one embodiment of the invention.

FIG. 11 is a diagram illustrating the transfer functions of the local graphs shown in FIG. 10 according to one embodiment of the invention.

FIG. 13 is a diagram illustrating the transfer functions of the pruned local graphs shown in FIG. 12 according to one embodiment of the invention.

DETAILED DESCRIPTION OF THE INVENTION

One embodiment of the invention is a pruning technique to reduce the size of the local graphs used in IPA solver for separately compilable software entities. The technique reduces the disk storage requirements and input/output overhead for files used for distributed IPA.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
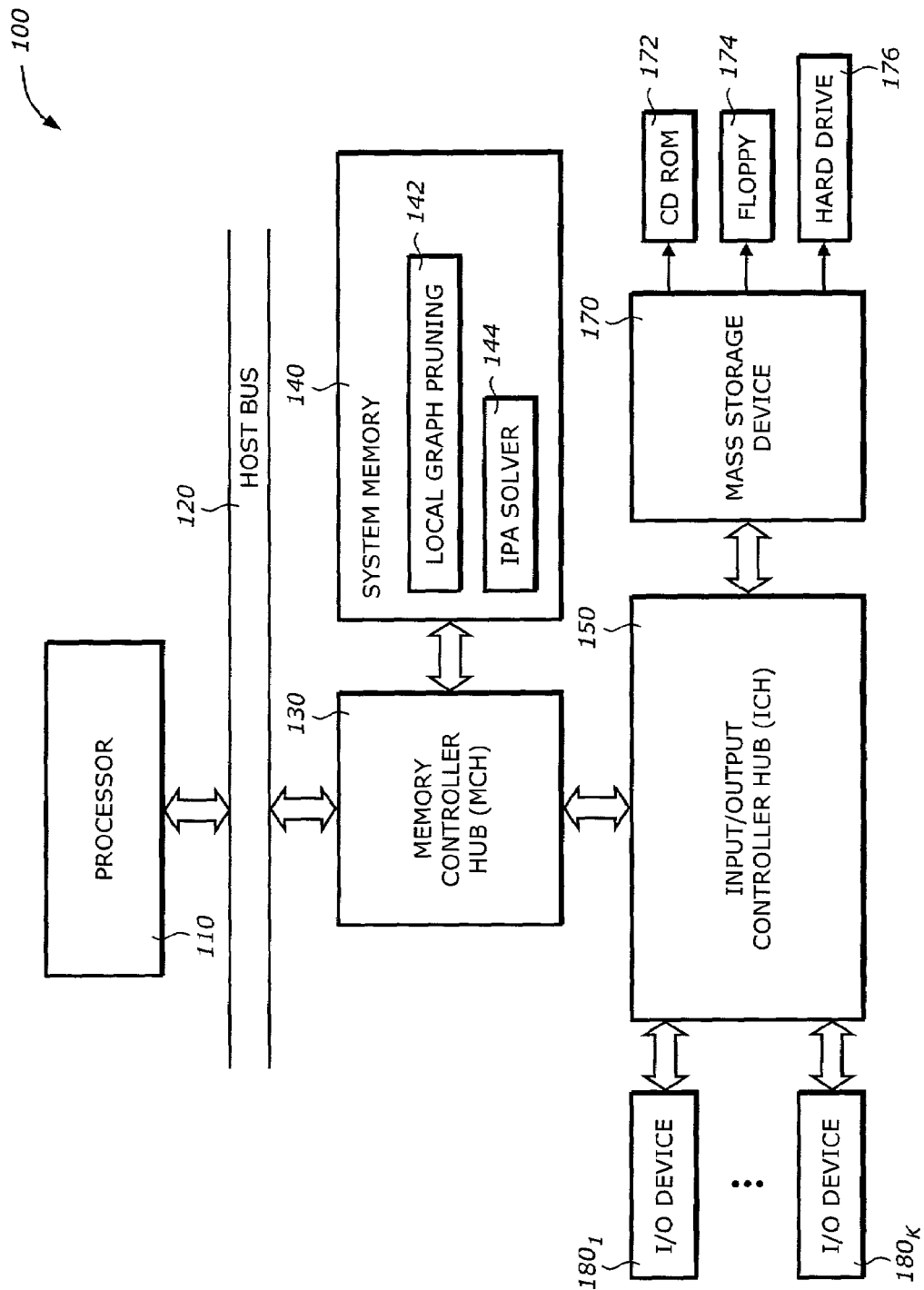
FIG. 1 is a diagram illustrating a system in which one embodiment of the invention can be practiced.

FIG. 1 is a diagram illustrating a computer system 100 in which one embodiment of the invention can be practiced. The computer system 100 includes a processor 110, a host bus 120, a memory control hub (MCH) 130, a system memory 140, an input/output control hub (ICH) 150, a mass storage device 170, and input/output devices $180_1$ to $180_K$.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In one embodiment, the processor 110 is compatible with the Intel Architecture (IA) processor, such as the IA-32 and the IA-64. The host bus 120 provides interface signals to allow the processor 110 to communicate with other processors or devices, e.g., the MCH 130. The host bus 120 may support a uniprocessor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory 140 includes a local graph pruning module 142 and an inter-procedural analysis (IPA) solver 144. The system memory 140 may also include other programs or data, which are not shown depending on the various embodiments of the invention. The instruction code stored in the memory 140, when executed by the processor 110, causes the processor to perform the tasks or operations as described in the following.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media. The mass storage device 170 may also be used to store representations of the separately compilable software components such a local graphs as generated by the local graph pruning module 142 and the IPA solver 144.

The I/O devices 180$_1$ to 180$_K$ may include any I/O devices to perform I/O functions. Examples of I/O devices 180$_1$ to 180$_K$ include controller for input devices (e.g., keyboard, mouse, trackball, pointing device), media card (e.g., audio, video, graphics), network card, and any other peripheral controllers.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The local graph pruning module 142 and the IPA solver 144 are used to optimize the IPA process for separately compilable software entities. The approach is based on a lattice-theoretic framework for IPA of programs consisting of more than one separately compiled translation units. Local inter-procedural problems are constructed for each translation unit, reduced, and merged together into a global problem to be solved. Local solutions are derived from the global solution, and used to optimize each translation unit when it is recompiled. All problems and solutions are formulated over lattices in a way that allows the framework to automatically determine when files are either recompiled (for correctness) or optionally recompiled (for possible improvement). The approach is based on graph theory and discrete mathematics with concepts in partial ordering, lattice, and lattice attributes.

A partial order is a relation, signified by the symbol $\leq$ having the following properties:
Transitive: $x \leq y$ and $y \leq z$ implies $x \leq z$.
Reflexive: $x \leq x$ is always true
Anti-symmetric: $(x \leq y)$ implies that either $x=y$ or not $(y \leq x)$ For example, the relation "is a divisor of" is a partial order for positive integers; the relation "is less than or equal to" is a partial order for integers; the relation "is a subset of" is a partial order if each element is a set. The ordering is "partial" because not all pairs of elements can be compared. For example, 2 is not a divisor of 3, nor vice-versa. When dealing with a partial order, for any two elements x or y, one of the following four situation holds:
$x=y$ is true
$x \leq y$ is true but $y \leq x$ is false
$y \leq x$ is true but $x \leq y$ is false
Both $x \leq y$ and $y \leq x$ are false
In the last case, the values are "incomparable".

The solutions are a monotone function of the problems: for two problems p and p' with respective solutions s and s', then $p \leq p'$ implies $s \leq s'$.

Typically, partial orders are lattices. A lattice is a partial ordering closed under the operations of a least upper bound and a greatest upper bound. The "meet" of a set of elements is an element that is less than or equal to every element in the set. For example, let "$\leq$" denote "is a divisor of". Then given {12, 24, 30}, the meet is 6, because 6 is a divisor of each element in the set and there is no larger divisor. 3 is a lower bound divisor, but since it is a divisor of 6, it is not the greatest. The "join" is an element that is greater than or equal to every element in the set. For "is a divisor of", the "join"

is simply the least common multiple. Closed means that the bounds exist in the set under discussion. For example, if the set were composite (non-prime) numbers only, then the "meet" of {12, 15 }, which is 3, would not be in the set.

The "top" of a lattice is the element that is the join for the set of all elements. The "bottom" is the meet for the set of all elements. Thus, "top" and "bottom" are the identity elements for "meet" and "join", respectively. For example, infinity is the top of the divisor lattice, and 1 is the bottom of that lattice.

A function f that maps a lattice of values onto itself is monotone if $x \leq y$ implies $f(x) \leq f(y)$ for any two lattice elements x and y. The set of monotone functions over a lattice of values form a lattice of functions, where $f \leq g$ if and only of $f(x) \leq g(x)$ for all lattice values x.

The composition f o g of two functions is defined by the relation (f o g)(x)=f(g(x)) for all x in the domain of g.

The usual form for representing a problem and a solution is a directed graph. A directed graph is a set of vertices and a set of directed edges. Each edge connects its tail vertex to its head vertex. An edge from vertex u to vertex v is denoted u→v. Each vertex of the graph has a lattice value, and each edge has a monotone lattice transfer function. Value of a vertex u is denoted as u.val or val(u). Transfer function of an edge e is denoted as e.func or func(e).

Figure 2:
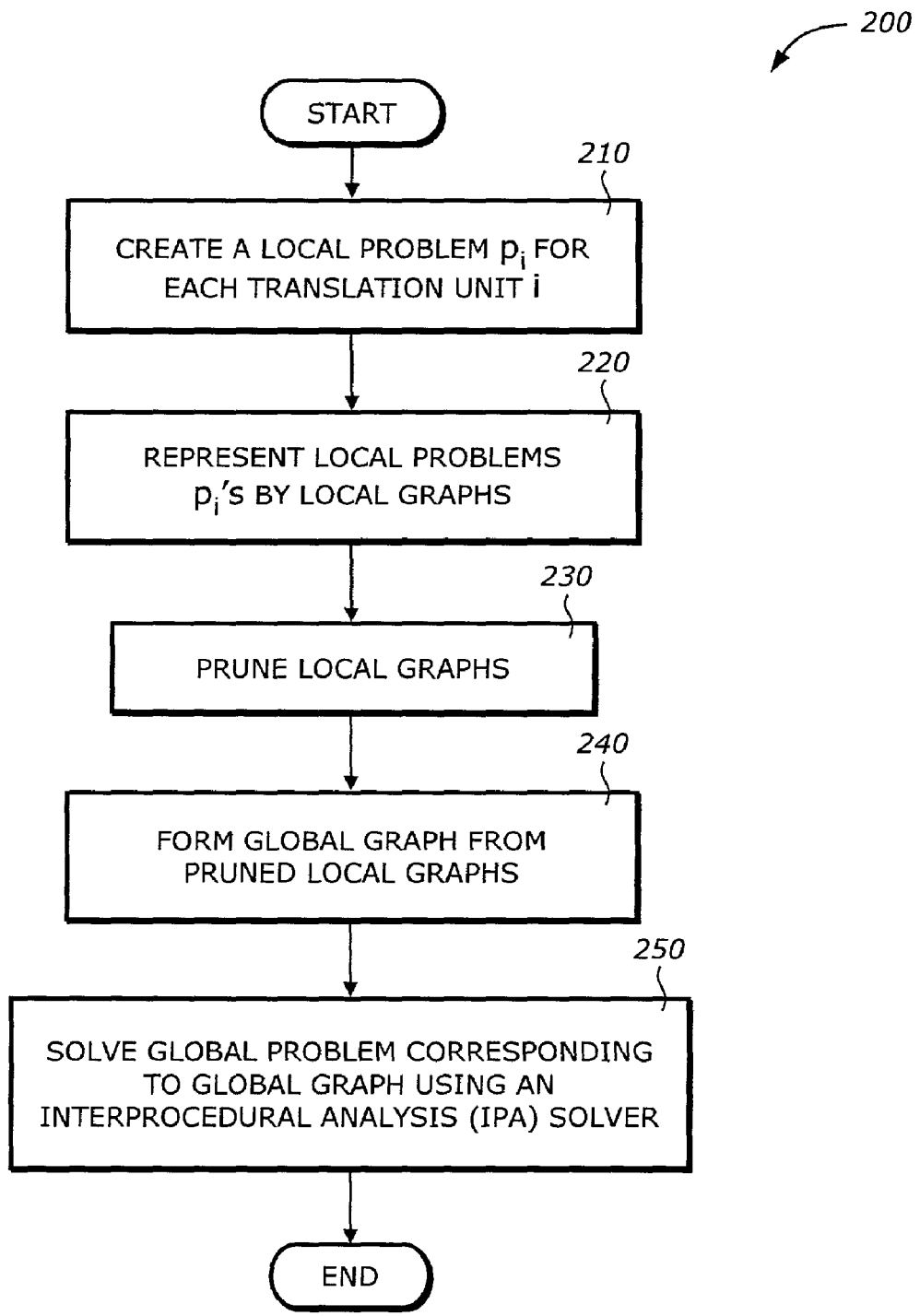
FIG. 2 is a flow chart illustrating a process to reduce storage in inter-procedural analysis solver according to one embodiment of the invention.

FIG. 2 is a flow chart illustrating a process 200 to reduce storage in inter-procedural analysis solver according to one embodiment of the invention.

Upon START, the process 200 creates a local problem $p_i$ for each translation unit i (Block 210). For N translation units, there are N local problems. The set of all possible problems form a partial order. The set of all possible solutions form a partial order. Next, the process 200 represents the local problems $p_1$'s by local graphs (Block 220). Then, the process 200 prunes the local graphs (Block 230). The pruned local graphs provide reduced storage requirements and speed up input/output (I/O) transfer time when files are written and read from disk.

Next, the process 200 forms a global graph from the pruned local graphs (Block 240). The global graph represents a global problem. Then, the process 200 solves the global problem using an inter-procedural analysis (IPA) solver. The process 200 is then terminated.

The IPA solver may include the following steps: (1) create a global problem P from the local problems such that $P \leq p_i$ for all i; (2) compute the solution S for the global problem P. The map from problems to solutions is monotone; (3) set each local solution $s_i$ such that $s_i \leq S$ for all i; (4) use solution $s_i$ to optimize translation unit i.

The local graphs are pruned or reduced and then merged together to form a global graph. The merging process in the IPA solver merges vertices with identical names. Anonymous vertices are never merged. Duplicate edges between the same pair of named vertices are merged into a single edge between the same vertices with a transfer function that is the lattice-meet of the transfer functions for the duplicates. A greatest fix-point global solution is then computed for the global graph, and some values for named vertices of the global are reported back to the local compilations. The greatest fix-point solution is a mapping of vertices to values, denoted SOL(v), where:

For all vertices, SOL(v)≦v.val
For all edges e of the form u→v: SOL(v)≦e.func(SOL(u))
There is no other SOL'(v) such that SOL(v)≦SOL'(v)

Condition (c) is not essential for correctness, but is merely preferred for sake of best optimization.

A local compilation of x.o sends a file x.opa to the IPA solver and the IPA solver sends back a file x.ipa. The visible part of the local problem is sent to the IPA solver via a "problem" section in the .opa file. The visible part is that which might affect the global solution. The technique in the invention reduces the size of the local graphs, or prunes the graphs, without changing the global solutions for the named vertices. This results in reduced size and I/O overhead for the .opa file. The IPA solver reads all the local problems $p_i$'s from the "problem" sections of the files and creates a global problem P that bounds them from below. It finds a global solution S. The local compilation determines what boundary values of the solution are needed to optimize its translation unit, and write requests for such to the "need" section of the opa file. The IPA solver reads this information, and writes out the boundary values to the "known" section of the .ipa file.

Figure 3:
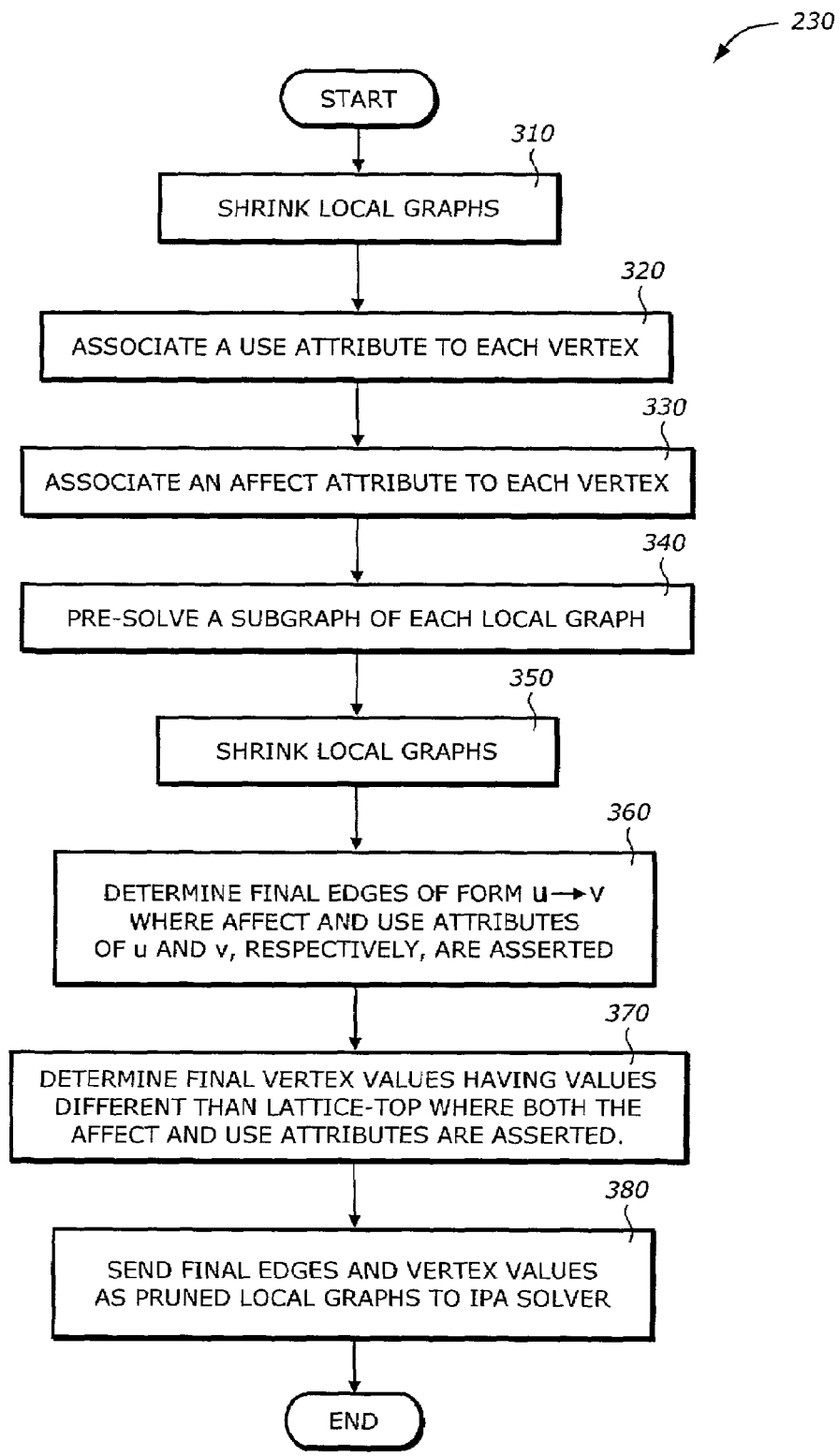
FIG. 3 is a flow chart illustrating a process to prune local graphs according to one embodiment of the invention.

FIG. 3 is a flow chart illustrating a process 230 to prune local graphs according to one embodiment of the invention.

Upon START, the process 230 applies a shrinking transform to shrink the local graphs (Block 310). The shrinking transform scans some special cases to perform preliminary graph reduction. The shrinking transform is described in FIG. 4A. Next, the process 230 associates a use attribute to each vertex in each of the local graphs (Block 320). The use attribute for a vertex v, when asserted, indicates that there is some named vertex u such that there is an edge u→v. Next, the process 230 associates an affect attribute to each vertex in each of the local graphs (Block 330). The affect attribute for a vertex u, when asserted, indicates that there is some named vertex v such that there is an edge u→v. In one embodiment, the use and affect attributes are Boolean variables where true and false values indicate that the underlying attribute is asserted and negated, respectively. The use and affect attributes of a vertex u may be denoted as u.uses_named_vertex and u.affects_nameddvertex, respectively.

Then, the process 230 pre-solves a subgraph of each of the local graphs (Block 340). The subgraph includes subgraph edges. Each of the subgraph edges connects a tail vertex to a head vertex where the tail vertex has a negated use attribute. Pre-solving the subgraph is solving a greatest fix-point problem for the subgraph of the local graph, yielding a solution SOL(w), and assigning w.val:=SOL(w) for each vertex w that is the head or tail of an edge in the subgraph. Doing so changes the values of the vertices such that the contribution of the local graph problem to the global graph problem is the same even if the subgraph's edges and anonymous vertices are removed. The purpose of the pre-solver is to push the constraints from parts of the graph that will be omitted from the global graph problem, which will be solved by the IPA solver, to parts of the graph that will be included in the global problem.

Next, the process 230 applies the shrinking transform again to the local graphs (Block 350). This is because the new values for the vertices may enable more opportunities for shrinking. In particular, the presolver may have set more vertices' values to bottom, thus permitting more edges to be removed by the shrinking transform as will be illustrated in FIG. 4B.

Then, the process 230 determine the final edges to be sent to the IPA solver (Block 360). The final edges are those edges of the form u→v where the affect attribute of u and the use attribute of v are asserted. Next, the process 230 determine the final vertex values to be sent to the IPA solver (Block 370). The final vertex values are those values that are different from the lattice top because values of top contribute no information and therefore can be elided. Since most of the vertex values are top, this saves space in the stored representation of the graph. The final edges and the final vertex values form the pruned local graphs. Next, the process 230 sends the final edges and final vertex values as pruned local graphs to the IPA solver (Block 380). The process 230 is then terminated.

Figure 4A:
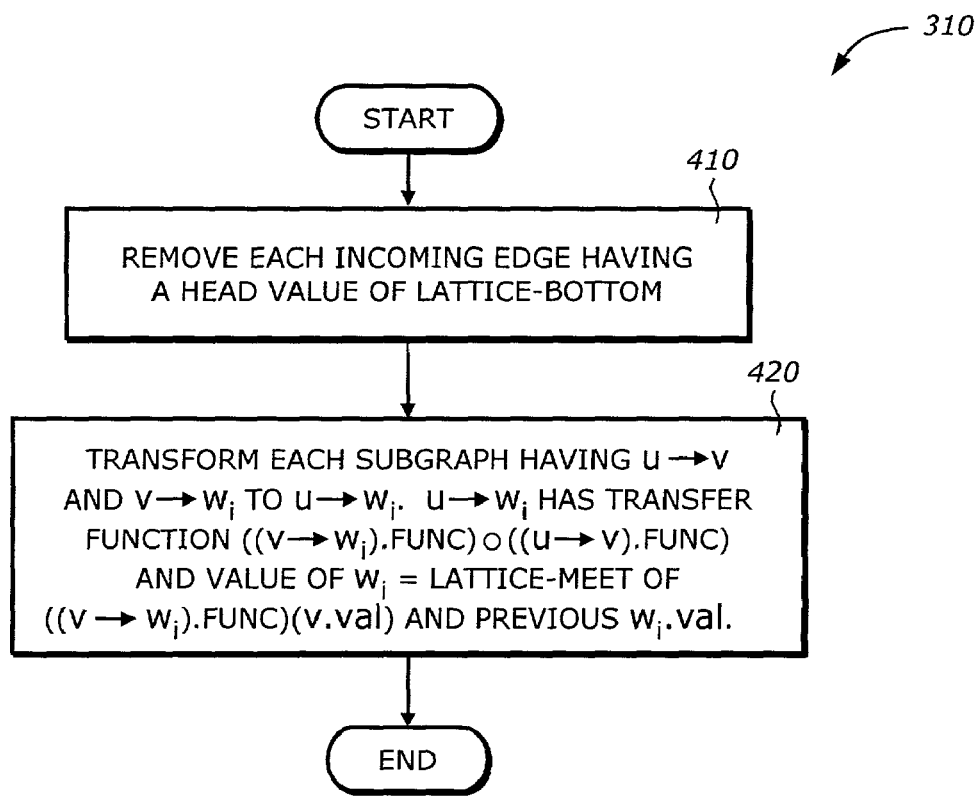
FIG. 4A is a flowchart illustrating a process to shrink the local graphs according to one embodiment of the invention.

FIG. 4A is a flowchart illustrating the process 310 to shrink the local graphs according to one embodiment of the invention. Note that the process 310 is optional and is used to further improve the reduction of the local graphs.

Upon START, the process 310 removes each incoming edge having a head value of a lattice bottom (Block 410). Such a value is lattice-bottom in the final solution and therefore the incoming edges add no information. This edge removal is advantageous because it tends to disconnect parts of the graph, which in turn often yields more favorable values (e.g., less "true" values) for the use and affect attributes computed in Blocks 320 and 330 in FIG. 2.

Next, the process 310 transforms each subgraph having edges u→v, where v is an anonymous vertex, and v→$w_i$, to u→$w_i$ (Block 420) where i=1, . . . , N. The edges u→v and v→$w_i$ have transfer functions (u→v). func and (v→$w_i$). The values of the vertices u, v, and $w_i$ are u.val, v.val, and $w_i$.val. Vertex v and both incident edges are removed. For each i, an edge u→$w_i$ is added, with transfer function ((v→$w_i$). func) o ((u→v). func). The value of $w_i$ is set to the lattice meet of ((v→$w_i$). func) (v.val) and the previous $w_i$.val. If this is not done, the constraint implied by v.val would be lost, possibly resulting in an incorrect answer. This is basically a limited case of the T2 transform as is well known to compiler writers, but applied only to anonymous vertices in the local graph. It cannot be applied when v is a named vertex since v might have more incident edges added later when the global graph is created by the IPA solver.

Figure 4B:
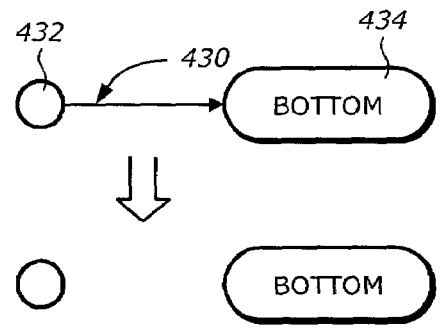
FIG. 4B is a diagram illustrating an edge removal in shrinking the graphs according to one embodiment of the invention.

FIG. 4B is a diagram illustrating an edge removal in shrinking the local graphs according to one embodiment of the invention. The example shows an edge 430 with a tail vertex 432 and a head vertex 434. The head vertex 434 has a bottom value. The shrinking transform removes the edge 430.

Figure 4C:
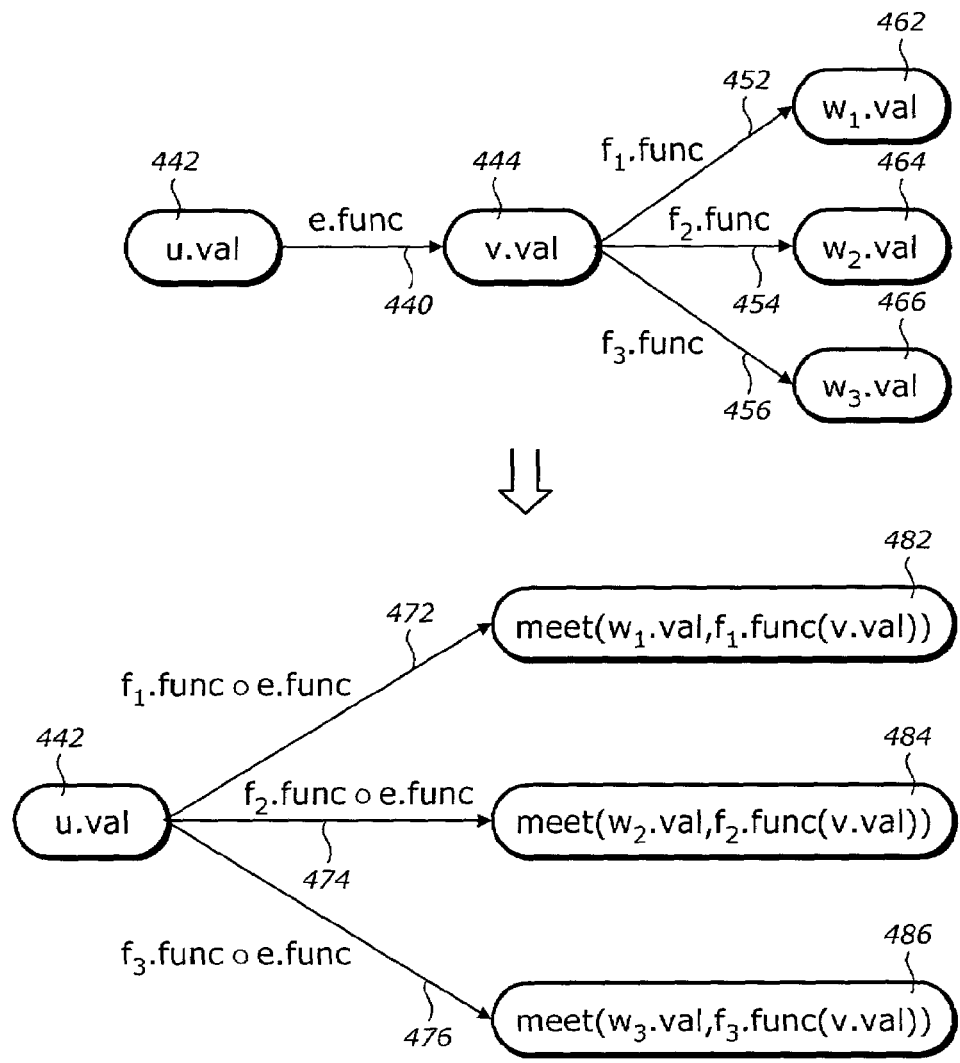
FIG. 4C is a diagram illustrating a subgraph transformation in shrinking the local graphs according to one embodiment of the invention.

FIG. 4C is a diagram illustrating a subgraph transformation in shrinking the local graphs according to one embodiment of the invention.

The original subgraph includes a vertex u 442 with value u.val, an anonymous vertex 444 with value v.val, an edge 440 with transfer function e.func connecting vertex u 442 and vertex v 444, vertices $w_1$, $w_2$, and $w_3$ 462, 464, and 466 with values $w_1$.val, $w_2$.val, and $w_3$.val respectively, edges 452, 454, and 456 with transfer functions $f_1$.func, $f_2$.func, and $f_3$.func, connecting vertex v 444 to vertices $w_1$ 462, $w_2$ 464, and $W_3$ 466, respectively.

After the shrinking transform, the vertex v 444 and edges 440, 452, 454, and 456 are removed. Edges 472, 474, and 476 are added to connect vertex u 442 and vertices 482, 484, and 486, respectively. Edges 472, 474, and 476 have transfer functions as the combination of the e.func and $f_1$.func, $f_2$.func, and $f_3$.func, respectively. In other words, the edges 472, 474, and 476 have transfer functions $f_1$.func o e.func, $f_2$.func o e.func, and $f_3$.func o e.func, respectively, where o is function composition. The values of the vertices 482, 484, and 486 are meet ($w_1$.val, $f_1$.func (v.val)), meet ($w_2$.val, $f_2$.func (v.val)), and meet ($w_3$.val, $f_3$.func (v.val)), respectively.

FIG. 5 is a pseudo code illustrating the process 320 to associate a use attribute shown in FIG. 3 according to one embodiment of the invention.

The process 320 essentially determines which vertices' values depend upon other named vertices' values. In other words, for each vertex v, is there some named vertex u such that there is a path from u to v? The process 320 first negates the use attributes for all vertices in the local graph. Then the process 320 invokes a mark use operation on u for each named vertex u in the local graph. In the mark use operation, the process 320 asserts the use attribute associated with u if the use attribute is negated. Then, for each edge connecting the named vertex u to a vertex v, the process 320 recursively invokes the mark use operation on v.

FIG. 6 is a pseudo code illustrating the process 330 to associate an affect attribute shown in FIG. 3 according to one embodiment of the invention.

The process 330 essentially determines which vertices' values affect named vertices' values. In other words, for each vertex u, is there some named vertex v such that there is a path from u to v? The process 330 first negates the use attributes for all vertices in the local graph. Then, the process 330 invokes a mark affect operation on v for each named vertex y in the local graph. In the mark affect operation, the process 330 asserts the use attribute associated with v if the use attribute is negated. Then, the process 330 recursively invokes the mark affect operation on u for each edge connecting the vertex u to a named vertex v.

Figure 7:
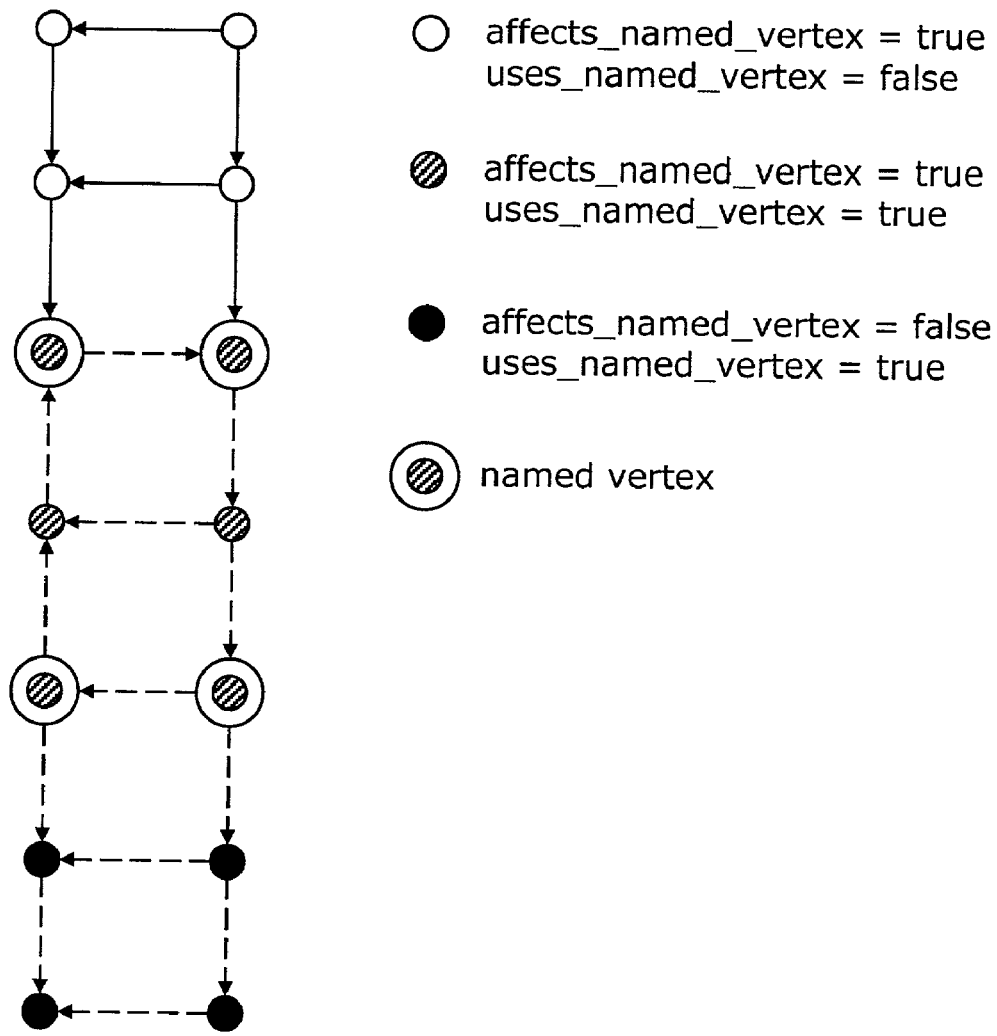
FIG. 7 is a diagram illustrating an example for the pre-solving shown in FIG. 3 according to one embodiment of the invention.

FIG. 7 is a diagram illustrating an example for the pre-solving shown in FIG. 3 according to one embodiment of the invention.

Note that the subgraph includes all edges u→v such that the u.uses_named_vertex=false; i.e., the vertex u having negated use attribute. In this example, information in the white vertices (those with u.uses_named_vertex=false; i.e., a negated use attribute) is propagated to the gray vertices. This is done by solving the greatest fix-point problem on the subgraph with solid edges, and setting w.val to the pre-solver's solution SOL(w) for each vertex w that is the tail or head of an edge in the subgraph. The reason for solving a subgraph and not the entire graph is that most of the gray vertices usually have a value of lattice-top, and Block 370 in FIG. 3 elides these values in the compressed representation of the graph. Solving for the entire graph would cause many of these values to become something other than top, thus requiring that their values be explicitly represented, resulting in uncompression.

FIG. 8 is a diagram illustrating an example of a three-point value lattice according to one embodiment of the invention. The lattice elements are EXTERNAL, STATIC, and UNREFERENCED, with EXTERNAL≦STATIC and STATIC≦UNREFERENCED.

FIG. 9 is a diagram illustrating an example in the C programming language of two translation units according to one embodiment of the invention.

Figure 10:
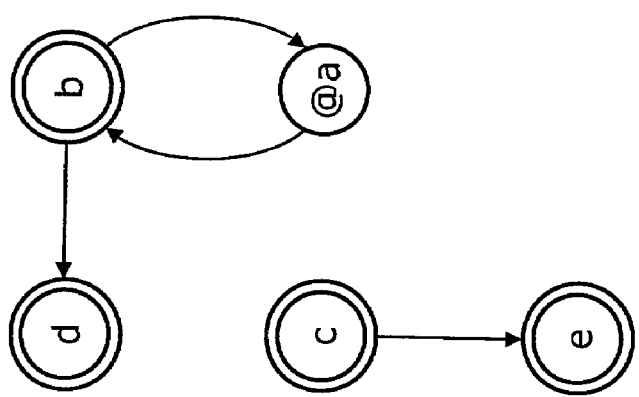
FIG. 10 is a diagram illustrating the local graphs for the two translation units shown in FIG. 9 according to one embodiment of the invention.
Figure 10:
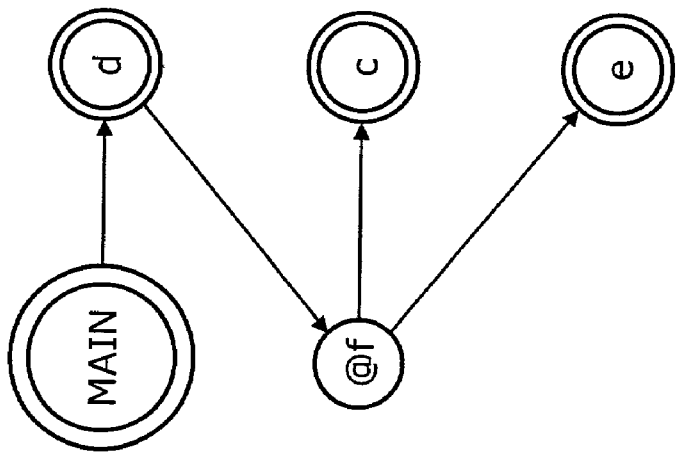

FIG. 10 is a diagram illustrating the local graphs for the two translation units shown in FIG. 9 according to one embodiment of the invention.

The double circles are the "needed" set. The value of a vertex is "needed" by a translation unit if the corresponding file-scope entity is defined in the translation unit and possibly exported to another translation unit. The global solution value for said vertex will indicate whether the entity can be removed or given static linkage.

The vertices for objects "f" and "a" are labeled with anonymous symbols @f and @a, respectively. They are anonymous because the corresponding entities have static linkage and thus cannot be seen directly outside their respective translation units. The values for anonymous vertices are not needed, because their values can be computed from boundary information. The lattice values at the vertices are all UNREFERENCED (top of lattice), except for "main", which a priori is known to be implicitly referenced, and thus gets a value of EXTERNAL.

FIG. 11 is a diagram illustrating the transfer functions of the local graphs shown in FIG. 10 according to one embodiment of the invention.

The lattice points are abbreviated by their initial letter (U, S, and E). For instance, the edge from "d" to "e" (@d→e) maps the lattice value UNREFERENCED to UNREFERENCED, and other lattice values to STATIC. The rationale is that if "f" is referenced in the program, then "e" is indirectly referenced via "f". The other lattice values are mapped to STATIC since the reference is between objects within the same translation unit.

Figure 12:
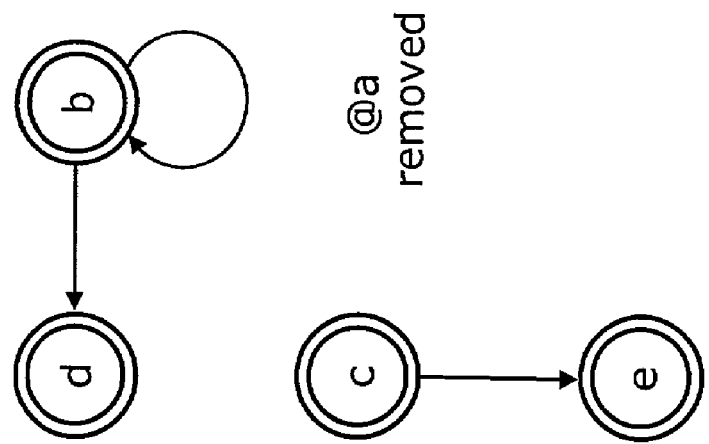
FIG. 12 is a diagram illustrating pruning the local graphs shown in FIG. 10 according to one embodiment of the invention.
Figure 12:
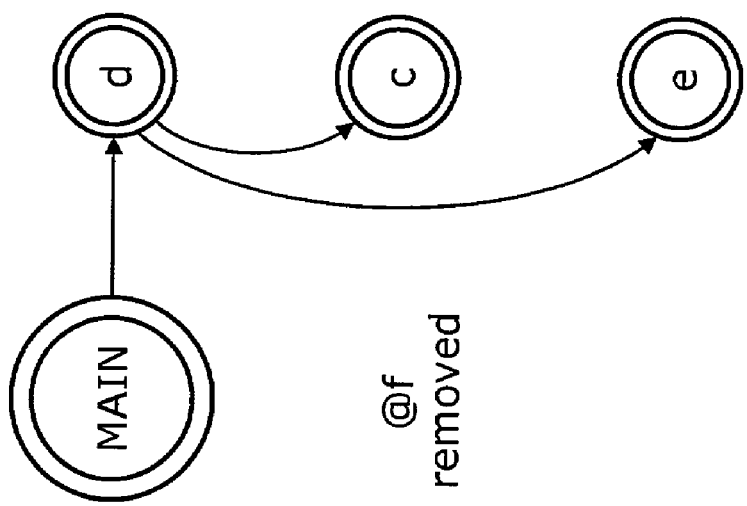

FIG. 12 is a diagram illustrating pruning the local graphs shown in FIG. 10 according to one embodiment of the invention.

The reduced graphs show the result after the shrinking transform. In particular, the subgraph transformation is applied to remove the anonymous vertices @f and @a. The double circles denote named vertices. Because all the anonymous vertices are removed, all the remaining ones end up being "gray", and the presolver step becomes vacuous.

FIG. 13 is a diagram illustrating the transfer functions of the pruned local graphs shown in FIG. 12 according to one embodiment of the invention.

Figure 14:
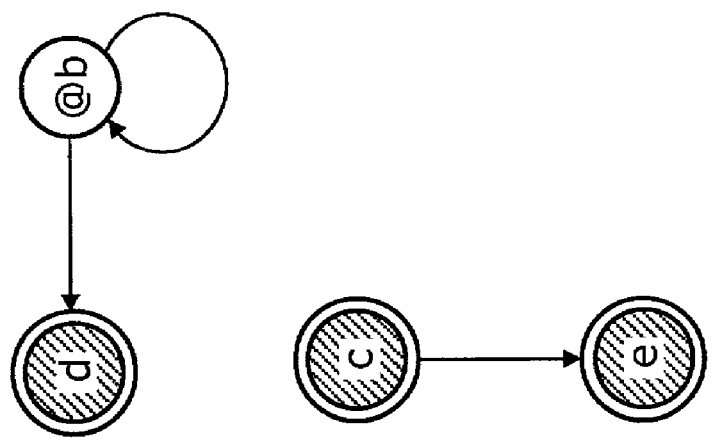
FIG. 14 is a diagram illustrating another example for pruning the local graphs according to one embodiment of the invention.

FIG. 14 is a diagram illustrating another example for pruning the local graph for a variant of the second translation unit, according to one embodiment of the invention.

In this example, suppose b had been an anonymous vertex, i.e., if routine "b" from FIG. 9 had been "static", then the vertex "b" would be white instead of gray, because its information flows to (or affects) a named vertex "d", but "b" itself does not use any named vertex. Note that vertices prefixed by @ are unnamed. Therefore, running the presolve for the variant of the second translation unit would solve only the subgraph consisting of vertices "b" and "d", and edges b→b and b→d. The fixed-point solver finds that the solution is "val(b)=UNREFERENCED" and "val(d) =UNREFERENCED".

Per block 370 of FIG. 3, only edge c→e would be sent to the IPA solver. The values of c and e would not be sent because they are "top".

Figure 15:
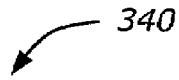
FIG. 15 is a diagram illustrating a process to pre-solve a subgraph according to one embodiment of the invention.

FIG. 15 is a pseudo code illustrating the process 340 to presolve a subgraph according to one embodiment of the invention. It integrates the calculation of SOL(w) with setting w.val:=SOL(w). i.e., it does the solution "in place" by operating directly upon w.val for each relevant vertex w; thus SOL(w) is not explicit in the steps. The process 340 has an outer loop and an inner loop. The outer loop iterates until the inner loop causes no changes. The inner loop iterates over each edge u→v in the graph, and if u has a negated uses_named_vertex attribute, computes the meet of v.val and the edge's transfer function applied to u.val. If the result is not the same as v.val, then v.val is set to the result, and the change noted, so that the outer loop will reiterate. General processes for solving fix-point problems on graphs are well-known to compiler writers. The novelty here is how only some of the edges are considered during pre-solving.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

I claim:

1. A method comprising:
    pruning local graphs representing local problems, the local problems corresponding to separately compilable components in a software program, each of the local graphs having edges and vertices, each edge having a transfer function, each vertex having a value, values of each of the local graph forming a lattice under a partial ordering wherein pruning the local graphs comprising:
    associating a use attribute to each one of the vertices in each of the local graphs, the use attribute being asserted for each vertex reachable from a named vertex; associating an affect attribute to each one of the vertices in each of the local graphs, the affect attribute is asserted for a vertex if a named vertex is reachable from the former vertex and pre-solving a subgraph of each of the local graphs, the subgraph including subgraph edges, each of the subgraph edges connecting a tail vertex to a head vertex, the tail vertex having a negated use attribute.

2. The method or claim 1 wherein pruning the local graphs further comprising:
    shrinking the local graphs.

3. The method of claim 2 further comprising solving a global problem to optimize a recompilation of the separately compilation components by an inter-procedural analysis (IPA) solver, the global problem being represented by a global graph formed from the pruned local graphs.

4. The method of claim 3 wherein pruning the local graphs further comprising:
    determining final edges and vertex values of the local graphs to be sent to IPA solve; and
    sending the final edges and vertex values to the IPA solver, the final edges and vertex values forming the pruned local graphs.

5. The method or claim 1 wherein associating the use attribute comprises:
    negating use attributes for all vertices in the local graph; and
    invoking a mark use operation on u for each named vertex u in the local graph.

6. The method of claim 5 wherein invoking the mark use operation on u comprises:
    asserting the use attribute associated with u if the use attribute is negated; and
    recursively invoking the mark use operation on v for each edge connecting the named vertex u to a vertex v.

7. The method of claim 1 wherein associating the affect attribute comprises:
    negating use attributes for all vertices in the local graph;
    invoking a mark affect operation on y for each named vertex y in the local graph.

8. The method of claim 7 wherein invoking the mark affect operation on y comprises:
    asserting the use attribute associated with y if the use attribute is negated; and
    recursively invoking the mark affect operation on x for each edge connecting the vertex x to a named vertex y.

9. The method of claim 1 wherein pre-solving the subgraph comprises:
    finding a greatest fix-point solution to the subgraph.

10. The method of claim 2 wherein shrinking comprises:
    removing an incoming edge having a head value of a lattice-bottom.

11. The method of claim 2 wherein shrinking further comprises:

transforming a subgraph having first and second edges, the first and second edges having first and second functions, the first edge connecting a first vertex to an anonymous vertex having a value v, the second edge connecting the anonymous vertex to a second vertex having a value w.

12. The method of claim 11 wherein transforming comprises:
   removing the anonymous vertex;
   removing the first and second edges;
   adding a third edge having a third function and connecting the first and second vertices, the third function being combined by the first and second functions; and
   changing value of the second vertex to a lattice meet of the second function of the value v and the value w.

13. The method of claim 4 wherein determining the final edges and vertex values comprises:
   determining each the final edges as edge having asserted use and affect attributes for tail and head vertices, respectively; and
   eliding each of the vertex values having a top value.

14. A computer program product comprising: a machine useable medium having computer program code embedded therein, the computer program product having: computer readable, program code to prune local graphs representing local problems, the local problems corresponding to separately compilable components in a software program, each of the local graphs having edges and vertices, each edge having a transfer function, each vertex having a value, values of each of the local graph forming a lattice under a partial ordering
   wherein the computer readable program code to prune the local graphs comprising: computer readable program code to associate a use attribute to each one of the vertices in each of the local graphs, the use attribute being asserted if there is an edge connecting a named vertex to the each one of the vertices; computer readable program code to associate an affect attribute to each one of the vertices in each of the local graphs, the affect attribute is asserted if there is an edge connecting the each one of the vertices to a named vertex; and computer readable program code to pre-solve a subgraph of each of the local graphs, the subgraph including subgraph edges, each of the subgraph edges connecting a tail vertex to a head vertex, the tail vertex having a negated use attribute.

15. The computer program product of claim 14 wherein the computer readable program code to prune the local graphs further comprising:
   computer readable program code to shrink the local graphs.

16. The computer program product of claim 14 further comprising:
   computer readable program code to solve a global problem to optimize a recompilation of the separately compilation components by an inter-procedural analysis (IPA) solver, the global problem being represented by a global graph formed from the pruned local graphs.

17. The computer program product of claim 16 wherein the computer readable program code to prune the local graphs further comprising:
   computer readable program code to determine final edges and vertex values of the local graphs to be sent to IPA solver; and
   computer readable program code to send the final edges and vertex values to the IPA solver, the final edges and vertex values forming the pruned local graphs.

18. The computer program product of claim 14 wherein the computer readable program code to associate the use attribute comprises:
   computer readable program code to negate use attributes for all vertices in the local graph;
   computer readable program code to invoke a mark use operation on u for each named vertex u in the local graph.

19. The computer program product of claim 17 wherein the computer readable program code to invoke the mark use operation on u comprises:
   computer readable program code to assert the use attribute associated with u if the use attribute is negated; and
   computer readable program code to recursively invoke the mark use operation on v for each edge connecting the named vertex u to a vertex v.

20. The computer program product of claim 14 wherein the computer readable program code to associate the affect attribute comprises:
   computer readable program code to negate use attributes for all vertices in the local graph; and
   computer readable program code to invoke a mark affect operation on y for each named vertex y in the local graph.

21. The computer program product or claim 20 wherein the computer readable program code to invoke the mark affect operation on y comprises:
   computer readable program code to assert the use attribute associated with y if the use attribute is negated; and
   computer readable program code to recursively invoke the mark affect operation on x for each edge connecting the vertex x to a named vertex y.

22. The computer program product of claim 14 wherein the computer readable program code to pre-solve the subgraph comprises:
   computer readable program code to find a greatest fixpoint solution to the subgraph.

23. The computer program product of claim 15 wherein the computer readable program code to shrink comprises:
   computer readable program code to remove an incoming edge having a head value of a lattice-bottom.

24. The computer program product of claim 15 wherein the computer readable program code to shrink further comprises:
   computer readable program code to transform a subgraph having first and second edges, the first and second edges having first and second functions, the first edge connecting a first vertex to an anonymous vertex having a value v, the second edge connecting the anonymous vertex to a second vertex having a value w.

25. The computer program product of claim 24 wherein the computer readable program code to transform comprises:
   computer readable program code to remove the anonymous vertex;
   computer readable program code to remove the first and second edges;
   computer readable program code to add a third edge having a third function and connecting the first and second vertices, the third function being combined by the first and second functions; and
   computer readable program code to change value of the second vertex to a lattice meet of the second function of the value v and the value w.

26. The computer program product of claim 17 wherein the computer readable program code to determine the final edges and vertex values comprises:

computer readable program code to determine each of the final edges as edge having asserted use and affect attributes for tail and head vertices, respectively; and computer readable program code to elide each of the vertex values having a top value.

27. A system comprising: a processor; and a memory coupled to the processor to store instruction code, the instruction code, when executed by the processor, causing the processor to: prune local graphs representing local problems, the local problems corresponding to separately compilable components in a software program, each of the local graphs having edges and vertices, each edge having a transfer function, each vertex having a value, values of each of the local graph forming a lattice under a partial ordering wherein the instruction code causing the processor to prune the local graphs causes the processor to: associate a use attribute to each one of the vertices in each of the local graphs, the use attribute being asserted if there is an edge connecting a named vertex to the each one of the vertices; associate an affect attribute to each one of the vertices in each of the local graphs, the affect attribute is asserted if there is an edge connecting the each one of the vertices to a named vertex; and pre-solve a subgraph of each of the local graphs, the subgraph including subgraph edges, each of the subgraph edges connecting a tail vertex to a head vertex, the tail vertex having a negated use attribute.

28. The system of claim 27 wherein the instruction code causing the processor to prune the local graphs further causes the processor to:
shrink the local graphs.

29. The system of claim 28 wherein the instruction code further causing the processor to:
solve a global problem to optimize a recompilation of the separately compilation components by an inter-procedural analysis (IPA) solver, the global problem being represented by a global graph formed from the pruned local graphs.

30. The system of claim 29 wherein the instruction code causing the processor to prune the local graphs further causes the processor to:
determine final edges and vertex values of the local graphs to be sent to IPA solver; and
send the final edges and vertex values to the IPA solver, the final edges and vertex values forming the pruned local graphs.

31. The system of claim 27 wherein the instruction code causing the processor to pre-solve the subgraph causes the processor to:
find a greatest fix-point solution to the subgraph.

32. The system of claim 28 wherein the instruction code causing the processor to shrink causes the processor to:
remove an incoming edge having a head value of a lattice-bottom.

33. The system of claim 32 wherein the instruction code causing the processor to shrink further causes the processor to:
transform a subgraph having first and second edges, the first and second edges having first and second functions, the first edge connecting a first vertex to an anonymous vertex having a value v, the second edge connecting the anonymous vertex to a second vertex having a value w.

34. The system of claim 33 wherein the instruction code causing the processor to transform causing the processor to:
remove the anonymous vertex;
remove the first and second edges;
add a third edge having a third function and connecting the first and second vertices, the third function being combined by the first and second functions; and
change value of the second vertex to a lattice meet of the second function of the value v and the value w.

35. The system of claim 30 wherein the instruction code causing the processor to determine the final edges and vertex values causes the processor to:
determine each of the final edges as edge having asserted use and affect attributes for tail and head vertices, respectively; and
elide each of the vertex values having a top value.

36. A method comprising:
constructing a local graph corresponding to a separately compilable component;
determining parts of the local graph affecting a global graph representing a combination of separately compilable components, comprising:
selecting an edge having a transfer function in a path from a named vertex to another named vertex in the local graph by asserting a use attribute for named vertices and recursively asserting the use attribute for successor vertices of a vertex with an asserted use attribute, and asserting an affect attribute for named vertices and recursively asserting the affect attribute for predecessor vertices with an asserted use attribute, and
selecting a vertex having asserted use and affect attributes and a lattice value; and
sending the selected edge and vertex to an inter-procedural analyzer.

37. The method of claim 36 further comprising:
shrinking the local graph.

38. The method or claim 37 further comprising:
pre-solving a subgraph of the local graph by computing a greatest fix-point position; and
re-applying shrinking the local graph.

39. The method of claim 37 wherein shrinking the local graph comprises:
for each anonymous vertex with a lattice value of bottom, removing the vertex,
setting value of each of the vertex's successors to bottom; and
for each anonymous vertex with a single incoming edge, changing tail of each edge outgoing from the anonymous vertex to tail of the incoming edge,
changing the transfer function of each outgoing edge to composition of transfer function of the incoming edge and the outgoing edge, and removing the anonymous vertex and the incoming edge.

* * * * *

UNITED STATES PATENT AND TRADEMARK OFFICE
CERTIFICATE OF CORRECTION

PATENT NO.       : 7,165,245 B2
APPLICATION NO.  : 09/844345
DATED            : January 16, 2007
INVENTOR(S)      : Robison It is certified that error appears in the above-identified patent and that said Letters Patent is hereby corrected as shown below:

In column 10, at line 32, delete "solve;" and insert --solver;--.
In column 11, at line 18, after "each" insert --of--.
In column 12, at line 25, delete "or" and insert --of--.

Signed and Sealed this

Fifteenth Day of April, 2008

JON W. DUDAS
*Director of the United States Patent and Trademark Office*